(12) United States Patent
Hwang (10) Patent No.: US 9,720,273 B2
(45) Date of Patent: Aug. 1, 2017

(54) DISPLAY DEVICE HAVING FUNCTIONAL PANEL

(71) Applicant: LG DISPLAY CO., LTD., Seoul (KR)

(72) Inventor: SeungWon Hwang, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/939,322

(22) Filed: Nov. 12, 2015

(65) Prior Publication Data

US 2016/0131934 A1 May 12, 2016

(30) Foreign Application Priority Data

Nov. 12, 2014 (KR) .......................... 10-2014-0157389

(51) Int. Cl.
*G02F 1/1333* (2006.01)
*G02F 1/1335* (2006.01)

(52) U.S. Cl.
CPC .... *G02F 1/13338* (2013.01); *G02F 1/133308* (2013.01); *G02F 1/133528* (2013.01); *G02F 2001/133317* (2013.01); *G02F 2201/50* (2013.01); *G02F 2202/22* (2013.01); *G02F 2202/28* (2013.01)

(58) Field of Classification Search
CPC .......... G02F 1/13338; G02F 1/133308; G02F 1/133528; G02F 1/133311
See application file for complete search history.

(56) References Cited

U.S. PATENT DOCUMENTS

| | | | | |
|---|---|---|---|---|
| 2013/0229592 | A1* | 9/2013 | Li | G02F 1/133308 349/58 |
| 2013/0300974 | A1* | 11/2013 | Yoshimoto | G02F 1/133308 349/58 |
| 2014/0118640 | A1* | 5/2014 | Chen | G02F 1/133308 349/12 |

* cited by examiner

*Primary Examiner* — James Dudek
(74) *Attorney, Agent, or Firm* — Dentons US LLP (57) ABSTRACT

Provided is a display device that includes, for example, a display panel to which a first polarizing plate and a second polarizing plate are attached to a lower surface and an upper surface thereof; a pad attached to an edge region of the upper surface of the display panel; an adhesive layer on upper surfaces of the display panel and the pad; and a functional panel attached to the upper surfaces of the display panel and the pad by an adhesive, wherein the upper surface of the pad is a sloped surface rising from a boundary with the second polarizing plate to an outer side.

8 Claims, 4 Drawing Sheets

DISPLAY DEVICE HAVING FUNCTIONAL PANEL

This application claims the benefit of Korea Patent Application No. 10-2014-0157389 filed on Nov. 12, 2014, which is incorporated herein by reference for all purposes as if fully set forth herein.

BACKGROUND OF THE INVENTION

Field of the Invention

The present invention relates to a display device and a method of manufacturing the same. More particularly, the present invention relates to a display device having a functional panel.

Discussion of the Related Art

Recently, as various portable electronic devices such as mobile phones and notebook computers, and counter electronic devices have been developed, the demand for lighter, thinner, shorter, and smaller flat panel display devices is growing. As flat panel display devices, liquid crystal displays (LCDs), organic electroluminescence displays (OLEDs), and the like, have been actively studied.

In general, for personal computers, portable communication devices, other personal-dedicated information processing devices, and the like, various input devices such as a keyboard, a mouse, a digitizer, and the like have been used as an interface with a user. As portable electronic devices have advanced, a touch panel, which is attached to a display device and allows a user to input information on the screen using his/her hand, a pen, and the like, in a direct contact manner, has been proposed and used as an input device, instead of conventional input devices such as a keyboard, a mouse, and the like.

Also, a display device for providing a three-dimensional (3D) stereoscopic image, which allows a user to view a three dimensional content, rather than a simple two-dimensional (2D) content, has recently been proposed.

For such a 3D display device, a parallax barrier or a 3D film patterned retarder (FPR) is typically attached to a front surface of the display panel to separate or divide an image into a left eye image and a right eye image and transfer the different images to the user's left eye and right eye, thus creating the effect of displaying a stereoscopic image.

In this manner, various functional panels such as a touch panel, a parallax barrier, a 3D FPR, and the like, have been attached to a front surface of the display panel of a display device for implementing various functions.

A display panel and a functional panel are typically attached together by an adhesive formed of a clear resin, or the like. Such an attachment of a display panel and a functional panel by an adhesive may cause the following problems.

A functional panel such as a touch panel is typically used for a portable electronic device such as a tablet PC or a portable phone. As such, an external force or impact may be applied thereto during the use of such a functional panel. When an external force is applied to a display device having a functional panel attached thereto by an adhesive, the cured adhesive may be damaged to weaken the adhesion between the display panel and the functional panel, and the weakened adhesion may cause a polarizing plate of the display device to be stripped (or separated) from a substrate.

Such a separation of the polarizing plate typically starts from an outer region and may reach the display region, which may cause a defect such as a white spot on the screen due to an error in adjusting the transmittance of the light passing through the polarizing plate.

SUMMARY OF THE INVENTION

Accordingly, the present invention is directed to a display device and a method of manufacturing the same that substantially obviate one or more problems due to limitations and disadvantages of the related art.

An advantage of the present invention is to provide a display device having a functional panel with improved stability and display quality.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device may, for example, include a display panel to which a first polarizing plate and a second polarizing plate are attached to a lower surface and an upper surface thereof; a pad attached to an edge region of the upper surface of the display panel; an adhesive layer on upper surfaces of the display panel and the pad; and a functional panel attached to the upper surfaces of the display panel and the pad by an adhesive, wherein the upper surface of the pad is a sloped surface rising from a boundary with the second polarizing plate to an outer side.

In another aspect of the present invention, a display device including a display panel having a upper surface and a lower surface, the display device may, for example, include a functional panel attached at least one of the upper and lower surfaces of the display panel by an adhesive; and a pad at an outer portion of the display panel, wherein the pad has a sloped surface so that the adhesive is filled to a boundary surface between the display panel and the pad when the functional panel is attached to the display panel.

In yet another aspect of the present invention, an apparatus may, for example, include a thin-film transistor (TFT) substrate; a color filter (C/F) substrate thereon; an upper polarizer on the C/F substrate; a cover glass over the upper polarizer with a direct boding (DB) material providing an adhesiveness therebetween; a conductive tape on the C/F substrate, along edges of the upper polarizer under the DB material, that provides a grounding; and an element on the conductive tape, having an upper surface with a particular configuration that allows said DB material to have improved uniform covering and curing properties when compared to a conventional shim tape without the element having the particular configuration.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Advantages and features of the embodiments of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this invention will be thorough and complete, and will fully convey the scope of the present invention to those skilled in the art. Further, the present invention can be defined by scope of the claims.

A shape, a size, a ratio, an angle, and a number disclosed in the drawings for describing embodiments of the present invention are merely an example, and thus, the inventive technical scope is not limited to the illustrated details. Like reference numerals refer to like elements throughout. In the following description, when the detailed description of the relevant known function or configuration is determined to unnecessarily obscure the technical concepts, the detailed description will be omitted. In a case where 'comprise', 'have', and 'include' described in the present specification are used, another part may be added unless 'only' is used. The terms of a singular form may include plural forms unless referred to the contrary.

In construing an element, an element is construed as including an error range although there is no explicit description.

In describing a positional relationship, for example, when two portions are described as "on", "above", "below", or "on the side", one or more other portions may be positioned between the two portions unless "immediately" or "directly" is used.

In describing a time relationship, for example, when the temporal order is described as 'after', 'subsequent', 'next', and 'before', a case which is not continuous may be included unless 'just' or 'direct' is used.

It would be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the technical concepts.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, embodiments of the present invention will be described in detail with reference to the accompanying drawings.

In order to attach a functional panel such as a touch panel or a panel for displaying a stereoscopic image to a display panel, various methods may be used. For example, a functional panel may be attached to a display panel using a double-sided tape, or a transparent adhesive resin such as an optical clear adhesive (OCA) or an optical clear resin (OCR). In this case, the adhesive strength may be lowered even when the adhesive strength of the double-sided tape is excellent, as compared with a case where the functional panel is directly attached to the display panel using an adhesive such as an adhesive resin. As a result, an optimal adhesion method in consideration of adhesive strength is typically a so-called direct adhesion method of attaching a functional panel to a display device using an adhesive.

According to an embodiment of the present invention, in order to secure an optimal adhesive strength, a functional panel and a display panel are attached together by an adhesive and an anti-stripping pad (or technically equivalent element) is attached to a side surface of a polarizing plate, which allows a stress caused by an external force to be applied to the anti-stripping pad, instead of the polarizing plate, such that the anti-stripping pad is subject to a stripping when an external force is applied.

In particular, the anti-stripping pad is formed to have a preset shape such that an adhesive is applied to a boundary surface between the polarizing plate and the anti-stripping pad, thus reducing or preventing defects due to an incomplete adhesive strength in the boundary surface between the polarizing plate and the anti-stripping pad.

Figure 1:
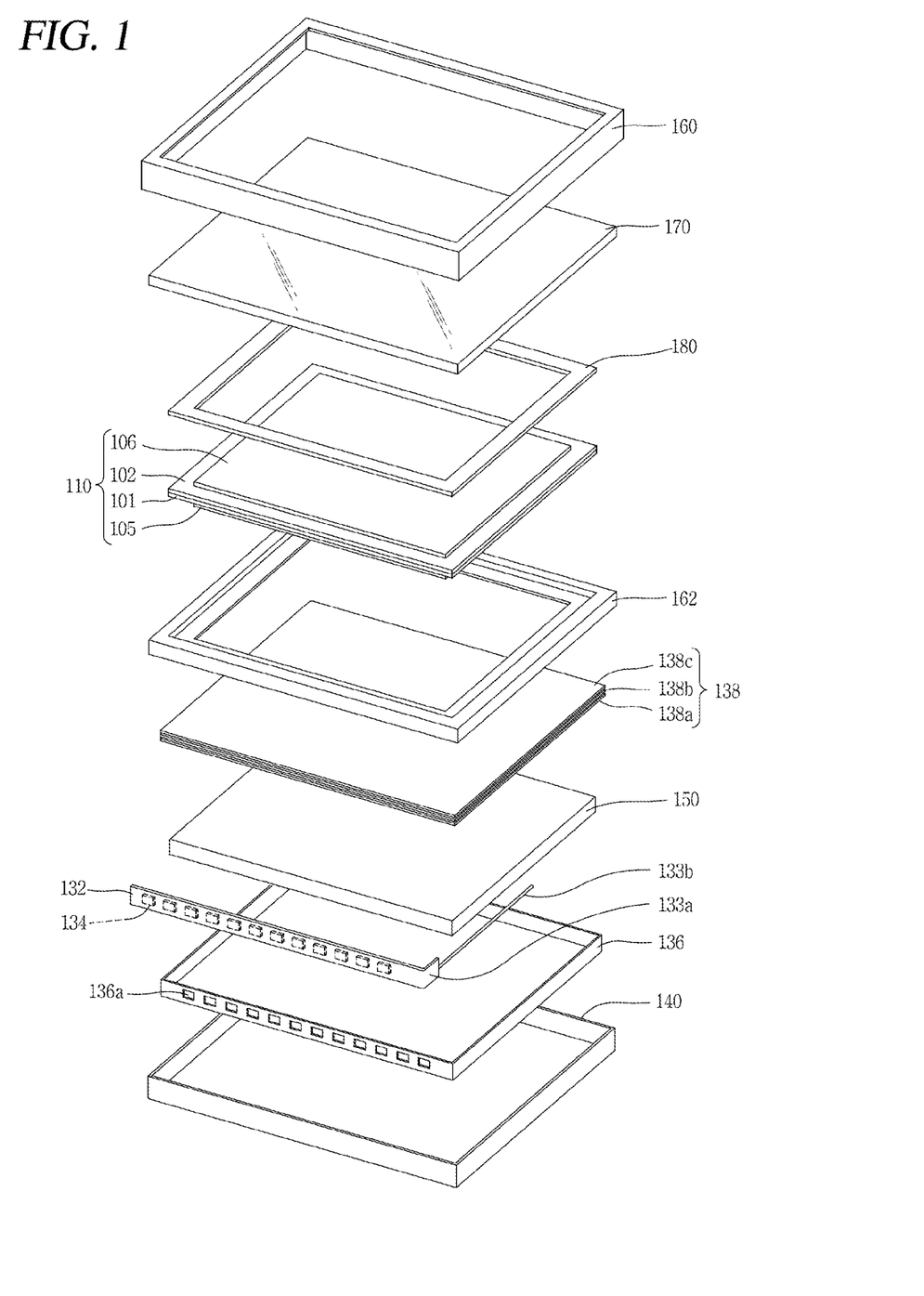
FIG. 1 is an exploded perspective view of a display device according to an embodiment of the present invention.
Figure 2:
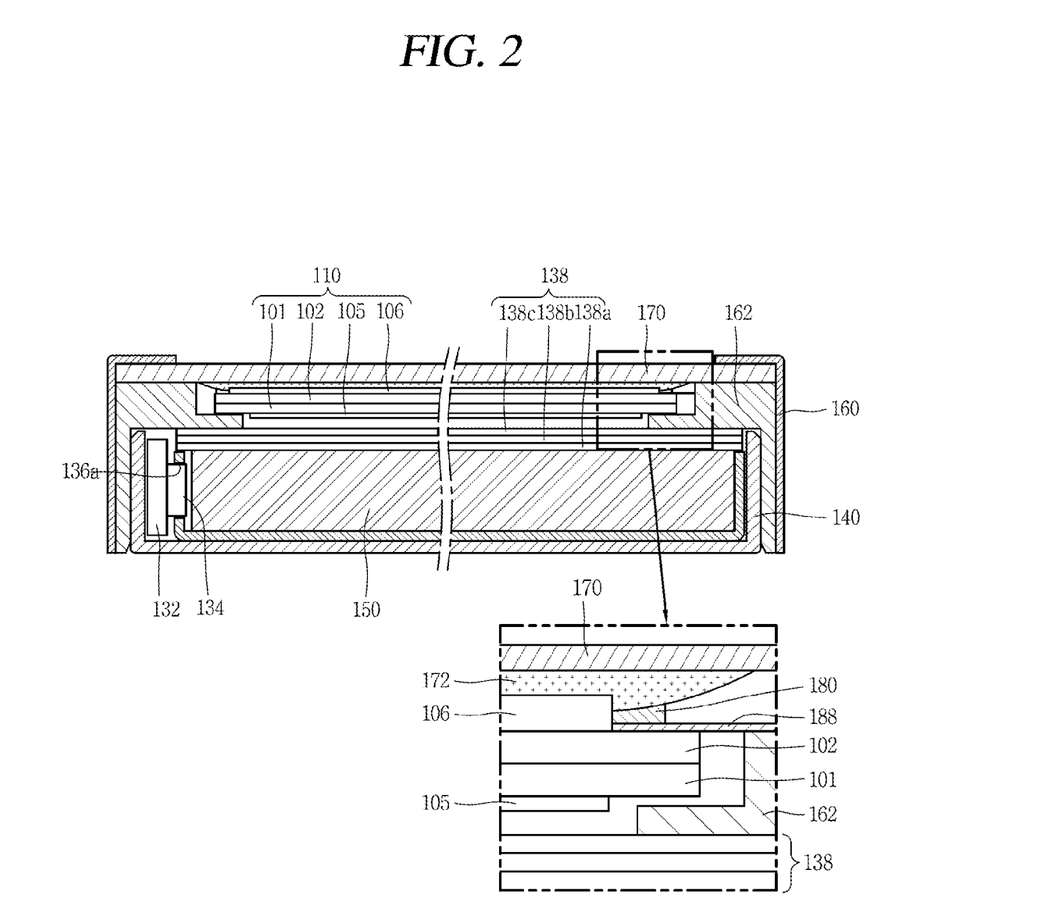
FIG. 2 is a cross-sectional view of a display device according to an embodiment of the present invention.

FIG. 1 is an exploded perspective view of a display device according to an embodiment of the invention, and FIG. 2 is a cross-sectional view of a display device according to an embodiment of the invention.

Herein, various types of display devices such as a liquid crystal display (LCD) device, an organic light emitting display (OLED) device, an electrophoretic display device, and the like, can be applied for the display device of FIG. 1, and an LCD will be described for the display device by way of example.

As illustrated in FIGS. 1 and 2, the LCD device according to an embodiment of the present invention includes a liquid crystal panel 110 and a backlight.

The liquid crystal panel 110 includes a first substrate 101, a second substrate 102, a liquid crystal layer disposed between the first substrate 101 and the second substrate 102, optical films such as a first polarizing plate 105 and a second polarizing plate 106 respectively attached to the first substrate 101 and the second substrate 103 to adjust a transmittance of the light incident to and output from the liquid crystal layer to display an image.

The backlight includes an LED board 132 disposed on a lower side surface of the liquid crystal panel 110 for allowing a plurality of LEDs 134 to be mounted thereon, a light guide plate 150 disposed below the liquid crystal panel for guiding the light emitted from the LED 134 toward the liquid crystal panel 110, a plurality of optical sheets 138 including a diffusion sheet 138a and prism sheets 138b and 138c provided between the liquid crystal panel 110 and the light guide plate 150 for diffusing and collecting the light guided from the light guide plate 150 and supplying the light to the liquid crystal panel 110, and a reflective plate 136 disposed below the light guide plate 150 for reflecting the light guided downwardly from the light guide plate 150.

The reflective plate 136, the light guide plate 150, and the optical sheets 138 are received in the lower cover 140, and the lower cover 140 and a guide panel 162 are coupled to be assembled.

The liquid crystal panel 110 is fixedly disposed above the guide panel 162, and a functional panel 170 is disposed above the liquid crystal panel 110.

An upper cover 160 is placed in an upper edge region of the function panel 170, and is coupled with the liquid crystal panel 110. The upper cover 160, and the guide panel 162, the liquid crystal panel 110, the functional panel 170, and the backlight are assembled together to complete an LCD device.

A plurality of gate lines and a plurality of data lines are arranged in a matrix to define a plurality of pixel regions on the first substrate 101. A thin film transistor (TFT), a switching element, is formed in each of the pixel regions, and a pixel electrode is formed in the pixel region. Also, each TFT includes a gate electrode connected to the gate line, a semiconductor layer formed of amorphous silicon and stacked on the gate electrode, and a source electrode and a drain electrode formed on the semiconductor layer and connected to the data line and the pixel electrode.

The second substrate 102 includes color filters composed of a plurality of sub-color filters implementing red (R), green (G), and blue (B) colors and a black matrix demarcating the sub-color filters and blocking the light transmitted from the liquid crystal layer.

The first substrate 101 and the second substrate 102 are attached in a facing manner by a sealant formed on an outer edge of an image display region, and the first substrate 101 and the second substrate 102 are attached through an attachment key (not shown) formed on the first substrate 101 or the second substrate 102.

Also, the first polarizing plate 105 and the second polarizing plate 106 are attached to the first substrate 101 and the second substrate 102, respectively, to polarize light input to or output from the liquid crystal panel 110 to adjust a transmittance of the light passing through the liquid crystal panel 110 to display an image.

The light guide plate 150 serves to guide the light emitted from the LEDs 134 to the liquid crystal panel 110. The light incident to one side surface of the light guide plate 150 is reflected from an upper surface and a lower surface of the light guide plate 150 to propagate to the other side surface thereof and be output outwardly from the light guide plate 150. Herein, the light guide plate 150 may be formed of a material such as PMMA (Polymethyl-Methacrylate), or the like, and can have a rectangular shape, but the shape of the light guide plate 150 is not particularly limited. In order to scatter the incident light, a pattern or recess portions may be formed on a lower surface of the light guide plate 150 to reflect the light incident through a light input surface in an upwardly direction.

The optical sheets 138 enhance efficiency of light output from the light guide plate 150 and supply the same to the liquid crystal panel 110. The optical sheets 138 include a diffusion sheet 138a for diffusing the light output from the light guide plate 150, and a first prism sheet 138b and a second prism sheet 138c for collecting the light diffused by the diffusion sheet 138a and supplying a uniform light to the liquid crystal panel 110. Herein, a single diffusion sheet 138a is provided, and two prism sheets, i.e., the first prism sheet 138b and the second prism sheet 138c in which prism axes are perpendicular to each other in x and y-axis directions, are provided to refract the light in the x and y-axis directions to enhance straightness of light.

As the LEDs 134, R, G, and B LEDs emitting red (R), green (G), and blue (B) monochromatic light, or an LED device emitting a white light may be used.

In case of disposing the LEDs emitting monochromatic light, R, G, and B monochromatic light LEDs may be alternately disposed at predetermined intervals and monochromatic light emitted from the LEDs is mixed into a white light and supplied to the liquid crystal panel 110. In case of providing an LED device emitting a white light, a plurality of LED devices may be disposed at predetermined intervals and supply a white light to the liquid crystal panel 110.

Herein, the white light LED device may include a blue LED emitting blue light and a phosphor absorbing a blue monochromatic light and emitting a yellow light. The blue monochromatic light output from the blue LED and the yellow monochromatic light emitted from the phosphor may be mixed and supplied as a white light to the liquid crystal panel 110. In FIG. 1, the LEDs 134 is disposed on one side, but the LEDs 134 may be disposed on both sides of the light guide plate 150.

The LEDs 134 are mounted on an LED board 132 formed of a metal or a flexible film. The LED board 132 is disposed along a side of the light guide plate 150 and faces the side of the light guide plate 150. The LEDs 134 are mounted on the LED board 132 and the light from the LEDs 134 is incident to the light guide plate 150 though the side of the light guide plate 150.

A flexible circuit board 133a is attached to and connected with an end portion of the LED board 132, and a wire 133b is attached to an end portion of the flexible circuit board 133b. The flexible circuit board 133a and the wire 133b connect the LEDs mounted on the LED board 132 to an external driving circuit unit so that an external signal and power are supplied to an LED controller, and that the LED controller drives the LEDs 134 according to the input signal. A signal line is formed on an upper surface or/and a lower surface of the flexible circuit board 133a and electrically connected to the wire 133b such that a signal from the driving circuit unit is input to the LED board 132 through the wire 133b and the signal line of the flexible circuit board 133a. It should be appreciated that the LEDs 134 is merely an example for a light source for supplying light to the liquid crystal panel 110, and that various types of light sources can be applied.

For example, a florescent lamp such as a cold cathode fluorescent lamp (CCFL) or an external electrode fluorescent lamp (EEFL) may be used. In case of using a fluorescent lamp, it is not necessary to use the LED board 132, and a lamp housing for receiving the fluorescent lamp may be disposed on one side of the light guide plate. A reflective material is applied to an inner surface of the lamp housing to reflect the light emitted from the fluorescent lamp to the side surface of the light guide plate 150 to enhance light efficiency.

The lower cover 140 includes a bottom surface positioned below the reflective plate 136 and a side wall surface for fixing the side surface of the light guide plate 150 and a rear surface of the LED board 132, and receives the reflective layer 136, the light guide plate 150, and the optical sheets 138 for assembling the backlight. Also, an external driving unit is provided outside of the lower cover 140 to apply a signal to the liquid crystal panel 110 and the LEDs 134.

The reflective plate 136 extends to portions of a lateral surface and an upper surface of the light guide plate 150, as well as a lower surface of the light guide plate 150. That is, regions of the side of the reflective plate 136 corresponding to the side where the LEDs 134 are disposed are removed to form windows 136a, and the LEDs 134 are disposed in the windows 136a.

Herein, the reflective plate 136 is disposed only below the light guide plate 150, rather than extending to portions of the side surface and the upper surface of the light guide plate 150, and the LEDs 134 may be received in a housing in which a reflective material is applied, and may be disposed on one side of the light guide plate 150.

The liquid crystal panel 110 is placed above the guide panel 162. The guide panel 162 has a rectangular shape, and edge regions of the liquid crystal panel 110 are placed on the guide panel 162.

The functional panel 170 is positioned above the liquid crystal panel 110. The functional panel 170 can be various types of functional panels such as a cover glass for absorbing an impact applied from the outside to reduce or prevent damage to the liquid crystal panel 110, a touch panel for inputting data by applying a touch through a user's hand or a touch pen, and an FPR or parallax barrier panel for implementing a 3D stereoscopic image by selectively blocking a path of light output from the liquid crystal panel 110.

The functional panel 170 is attached to the liquid crystal panel 110 by an adhesive 172 formed of a clear resin such as an Optical Clear Adhesive (OCA) or an Optical Clear Resin (OCR). However, any material can be used as the adhesive 172, so long as the material does not substantially change optical characteristics of the light output from the liquid crystal panel 110.

An anti-stripping pad 180 is attached to the second substrate 102. The anti-stripping pad 180 functions as a shim material (shim tape) between a conductive tape 188 and the adhesive 172. Herein, the anti-stripping pad 180 is formed to have a preset width and thickness, and is disposed along an outer circumference of the second substrate 102. In particular, the anti-stripping pad 180 is attached to the second substrate 102 along an outer edge of the second polarizing plate 106, and thus, the anti-stripping pad 180 and a side surface of the second polarizing plate 106 may be in contact with each other.

Meanwhile, a conductive tape 188 may be disposed below the anti-stripping pad 180. As for the conductive tape 188, a transparent metal oxide layer such as indium tin oxide (ITO) or indium zinc oxide (IZO) may be formed on a film formed of a resin, or the like, and the metal oxide layer is attached to a rear surface (a surface to which the second polarizing plate 102 is attached) of the second substrate 102. The conductive tape 188 extends to an outer region of the liquid crystal panel 110 and is connected to a component formed of a metal material such as a lower case to discharge a static electricity generated in a rear surface of the liquid crystal panel 110 outwardly. However, the conductive tape 188 may not be attached to the rear surface of the second substrate 102.

An adhesive layer 172 having a preset thickness may be formed on the second polarizing plate 106 and the anti-stripping pad 180 to attach the functional panel 170 and the liquid crystal panel 110. The adhesive layer 172 may be formed by applying a clear adhesive such as an OCA or an OCR through various methods such as a slit coating method, a screen coating method, a syringe coating method, or the like.

As described above, the adhesive layer 172 is also formed on an upper surface of the anti-stripping pad 180, as well as on an upper surface of the second polarizing plate 106, to attach the functional panel 170 to the upper surfaces of the second polarizing plate 106 and the anti-stripping pad 180. This is because, in the structure in which the adhesive layer 172 is applied to the second polarizing plate 106 and the second substrate 102 to attach the functional panel 170 to the liquid crystal panel 110, if an external force or impact is applied, a physical stress may be delivered to a boundary surface of the adhesive layer 172 to damage an edge region of the cured adhesive layer 172, which may lower an adhesion strength of the adhesive layer 172 and make an edge region of the second polarizing plate 106 stripped (or dislodged) or become unattached from the liquid crystal panel 110.

Meanwhile, the second polarizing plate 106 is attached to correspond to a display region of the liquid crystal panel 110. Thus, when an edge region of the second polarizing plate 106 is stripped from the liquid crystal panel 110 and such a stripping reaches the display region, a defect such as a white spot or a bright line may occur in the edge region of the screen due to an error in adjusting of a transmittance of the light passing through the second polarizing plate 106.

In this embodiment, because the anti-stripping pad 180 is disposed on a side surface of the second polarizing plate 106, because the adhesive layer 172 is applied to upper surfaces of the second polarizing plate 106 and the anti-stripping pad 180 and/or because the functional panel 170 is attached to the adhesive layer 172, a stress due to an external force is applied to an edge region of the adhesive layer 172 where the anti-stripping pad 180 is disposed, rather than to the adhesive layer 172 to which the second polarizing plate 106 is attached.

As a result, the adhesive layer 172 corresponding to the edge region of the pad 180, rather than the adhesive layer 172 corresponding to the edge region of the second polarizing plate 106, can be damaged by such a stress, and thus, the edge region of the anti-stripping pad 180, rather than the edge region of the second polarizing plate 106, may be stripped.

Herein, the anti-stripping pad 180 is attached to a region corresponding to an outer region of the display region, rather than being attached to a region corresponding to the display region. Thus, even when the edge region of the pad 180 is stripped by an external force, it may not actually affect the display region of the liquid crystal panel 110, thus reducing or minimizing defective image quality. In other words, a damage to the adhesive layer 172 by a stress due to an external force may not be fully prevented, but an occurrence of defect in the display region can be reduced or minimized by changing a damage region of the adhesive layer 172 to the outer region, rather than, the display region.

Herein, the anti-stripping pad 180 may be formed of polyethyleneterephthalate or silicon, but it can be formed of various materials. Also, an adhesive or a double-sided tape is provided on a lower surface of the pad 180 to attach the pad 180 to the second substrate 102.

The anti-stripping pad 180 may have various shapes. As illustrated in FIG. 2, an upper surface of the pad 180 is curved with a predetermined curvature, rather than being flat. This will now be described with reference to the accompanying drawings.

Figure 3A:
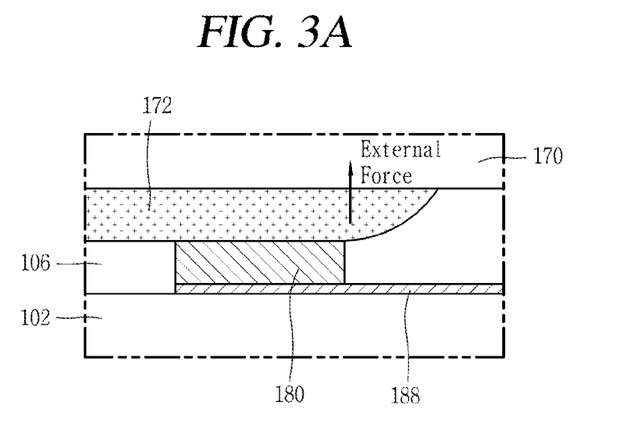
FIGS. 3A through 3C are views illustrating a method of attaching a liquid crystal panel and a functional panel when an upper surface of a pad is flat.
Figure 3B:
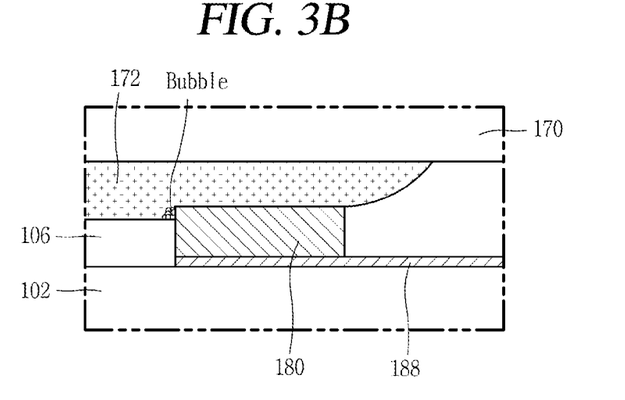
Figure 3C:
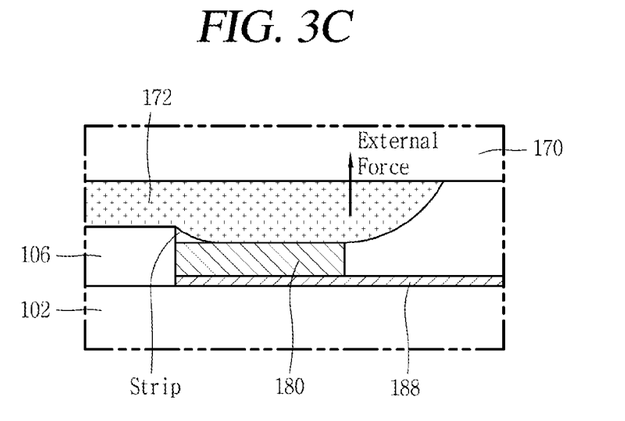

FIGS. 3A through 3C are views illustrating a method of attaching the liquid crystal panel 110 and the functional panel 170 when the upper surface of the anti-stripping pad 180 is flat.

As illustrated in FIG. 3A, in the case of the anti-stripping pad 180 having a flat upper surface, the anti-stripping pad 180 is attached to the second substrate 102 such that an upper surface of the anti-stripping pad 180 is at the same level as an upper surface of the second polarizing plate 105, and an adhesive is applied to the upper surfaces of the pad 180 and the second polarizing plate 106 to form the adhesive layer 172, and the functional panel 170 is attached thereto.

However, due to manufacturing tolerance, or the like, some thickness deviance may occur in the anti-stripping pad 180 and thus, when the anti-stripping pad 180 is actually attached to the liquid crystal panel 110, the upper surface of the anti-stripping pad 180 may not be at the same level as the upper surface of the second polarizing plate 106. In addition, since the anti-stripping pad 180 is typically attached manually by an operator, an operation tolerance may also occur, making it difficult for the upper surface of the pad 180 to be at the same level as the second polarizing plate 106.

As illustrated in FIG. 3B, when the anti-stripping pad 180 is attached to the second substrate 102, if the upper surface of the pad 180 is higher than an upper surface of the second polarizing plate 106, a step is generated between the second polarizing plate 106 and the anti-stripping pad 180. Thus, when an adhesive is applied, the adhesive may not be completely applied to the step region, and in particular, the adhesive may not be applied to an upper edge region of the second polarizing plate 106, causing air bubbles to penetrate into an interior of the adhesive layer 172 above the second polarizing plate 106 along the region where the adhesive has not been applied.

When air bubbles are generated within the adhesive layer 172, an adhesion strength of the adhesive layer 172 is weakened so that the second polarizing plate 106 may come off when an external force, or the like is applied, causing a light leakage therein. Also, the light transmitting through the second polarizing plate 106 may be refracted by the air bubbles, causing a defect.

As illustrated in FIG. 3C, when the anti-stripping pad 180 is attached to the second substrate 102, when the upper surface of the pad 180 is lower than the upper surface of the second polarizing plate 106, a step is generated between the second polarizing plate 106 and the anti-stripping pad 180. Thus, when an adhesive is applied, the adhesive may not be completely applied to the step region, and in particular, the adhesive may not be applied to an upper portion of the anti-stripping pad 180, and thus, a portion of the anti-stripping pad 180 adjacent to the second polarizing plate 106 may not be attached by the adhesive layer 172. As a result, when an external force is applied from the outside, the external force may exert on an edge region of the second polarizing plate adjacent to the region where the adhesive has not been applied, as well as on an edge region of the anti-stripping pad 180 (that is, an opposite edge region of the second polarizing plate 106), and thus, the edge region of the second polarizing plate 106 and the anti-stripping pad 180 may be stripped by the external force, causing a defect.

As described above, when the upper surface of the pad 180 is flat, since the upper surface of the anti-stripping pad 180 and the upper surface of the second polarizing plate 106 are not at the same level due to, for example, manufacturing and operation tolerances, a defect may be generated. In order to address this problem, the anti-stripping pad 180 may be formed to have a preset thickness and the operation tolerance may be minimized, but since manufacturing and operation tolerances are inevitable errors, it may be difficult to fully address the problem.

In this embodiment, the foregoing problem can be addressed by changing a shape of the upper surface of the anti-stripping pad 180. That is, as illustrated in FIG. 2, the upper surface of the anti-stripping pad 180 is formed to be sloped or curved with a predetermined curvature, thereby reducing or preventing an attachment defect of the upper surfaces of the second polarizing plate 106 and the anti-stripping pad 180. This will now be described in detail with reference to FIGS. 4A through 4C.

Figure 4A:
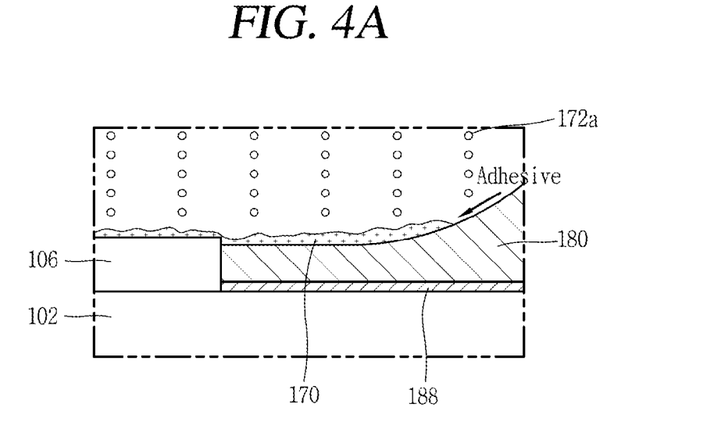
FIGS. 4A through 4C are views illustrating a method of attaching a liquid crystal panel and a functional panel when an upper surface of a pad is curved with a curvature.

As illustrated in FIG. 4A, the anti-stripping pad 180 is formed to have different thicknesses depending on positions such that the upper surface of the pad 180 is formed to be curved, rather than being flat, and is bent in an upward direction toward an outward direction of the display panel (that is, the anti-stripping pad 180 is formed to become thicker toward an outer side from the region where the pad 180 is in contact with the second polarizing plate 106).

Also, a thickness of the anti-stripping pad 180 where the anti-stripping pad 180 is in contact with the second polarizing plate 106 is smaller than that of the second polarizing plate 106, and thus, when the anti-stripping pad 180 is attached to the second substrate 102, a step is formed between the upper surfaces of the second polarizing plate 106 and the pad 180. Herein, in the step, the upper surface of the anti-stripping pad 180 is lower than that of the second polarizing plate 106.

In this configuration, when an adhesive is applied to the upper surfaces of the second polarizing plate 106 and the anti-stripping pad 180 by, for example, a slit coating method, a screen coating method, and a syringe coating method, the adhesive 172a is applied to the upper surfaces of the second polarizing plate 106 and the anti-stripping pad 180.

Herein, since the upper surface of the anti-stripping pad 180 has a sloped surface rising in an upward direction from the side where the anti-stripping pad 180 is in contact with the second polarizing plate 106 toward the outside, in particular, a curved sloped surface, and thus, the adhesive 172a applied to an outer portion of the pad 180 flows to the region where the anti-stripping pad 180 is in contact with the second polarizing plate 106 along the upper sloped surface of the pad 180 due to gravity. Thus, in the upper surface of the anti-stripping pad 180, the adhesive 172a can be applied to the region where the step is formed with the second polarizing plate 106.

Figure 4B:
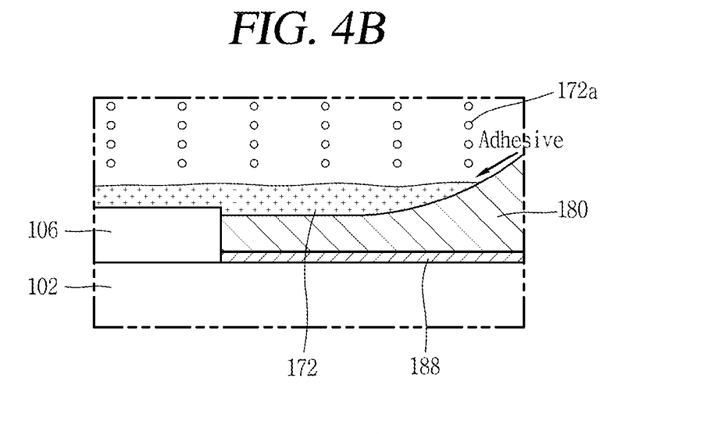

As illustrated in FIG. 4B, when the adhesive 172a is continuously applied to the upper surfaces of the second polarizing plate 106 and the anti-stripping pad 180, the adhesive 172a may completely fill the step region between the upper surfaces of the second polarizing plate 106 and the pad 180 and subsequently applied to the upper surfaces of the second polarizing plate 106 and the pad 180, forming the adhesive layer 172 having a predetermined thickness. Since the adhesive layer 172 is formed in an entire region of the upper surfaces of the second polarizing plate 106 and the pad 180, an uniform adhesion strength can be maintained.

Figure 4C:
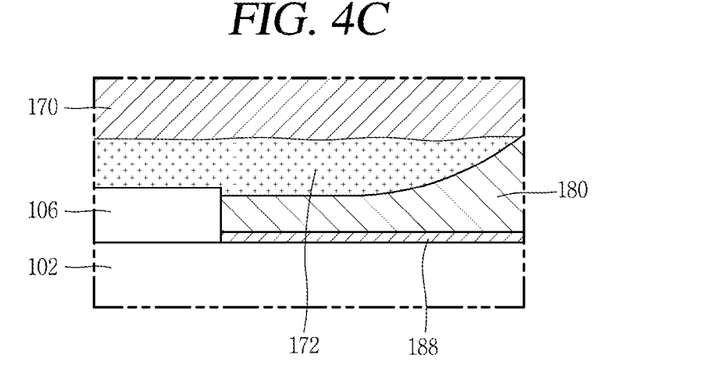

Thereafter, as illustrated in FIG. 4C, the functional panel 170 is positioned on the applied adhesive layer 172, a pressure is applied, and an ultraviolet ray or heat is subsequently applied to cure the adhesive layer 172 to attach the functional panel 170 to the liquid crystal panel 110. In this case, since the adhesive layer 172 is formed in an entire region including the step between the upper surfaces of the second polarizing plate 106 and the anti-stripping pad 180, penetration of air bubbles into the adhesive layer 172 in the step region of the upper surfaces of the second polarizing plate 106 and the anti-stripping pad 180 can be reduced or prevented. Also, in a case where an external force is exerted, the adhesive layer 172 above the second polarizing plate 106 may not be damaged even when the second polarizing plate 160 is stripped, but the adhesive layer 172 above an outer portion of the anti-stripping pad 180 is damaged and stripped from the edge region of the anti-stripping pad 180.

In this manner, since the upper surface of the anti-stripping pad 180 is formed to be sloped, when an adhesive is applied, the adhesive flows to a step region between the anti-stripping pad 180 and the second polarizing plate 106 along the sloped surface to be fully applied to the step region between the pad 180 and the second polarizing plate 106, whereby generation of a defect due to a step region between the anti-stripping pad 180 and the second polarizing plate 106 can be reduced or prevented.

In the detailed description, a structure of an LCD device has been specifically described, but the present invention is not limited thereto. For example, various types of display panels, functional panels and backlights can be applied.

As described above, when the functional panel is attached to the upper surface of the polarizing plate, the anti-stripping pad having a sloped upper surface is attached to apply an external force to the anti-stripping pad, rather than to the polarizing plate, thus reducing or preventing the polarizing plate from being stripped into the display region. The present embodiment can also be applied to a display panel in which a functional panel is attached to an upper surface of a polarizing plate.

The present embodiment can also be described with an apparatus comprising: a thin-film transistor (TFT) substrate; a color filter (C/F) substrate thereon; an upper polarizer on the C/F substrate; a cover glass over the upper polarizer with direct boding (DB) material providing necessary adhesiveness therebetween; a conductive tape, on the C/F substrate along edges of the upper polarizer under the DB material, that provides grounding; and a pad element on the conductive tape, having an upper surface with a particular configuration that allows the DB material to have improved uniform covering and curing properties when compared to a conventional shim tape without the element having the particular configuration.

Herein, the pad element is formed of a non-planar shim material, and the sloped surface of the non-planar shim material can be configured in consideration of manufacturing tolerance and/or operation tolerance.

It will be apparent to those skilled in the art that various modifications and variation can be made in the present invention without departing from the concepts and scope of the invention. Thus, it is intended that the present invention cover the modifications and variations of this invention provided they come within the scope of the appended claims and their equivalents.

What is claimed is:

1. A display device comprising:
    a display panel to which a first polarizing plate and a second polarizing plate are attached to a lower surface and an upper surface thereof;
    a pad attached to an edge region of the upper surface of the display panel;
    an adhesive layer on upper surfaces of the display panel and the pad; and
    a functional panel attached to the upper surfaces of the display panel and the pad by an adhesive,
    wherein the upper surface of the pad is a sloped surface rising from a boundary with the second polarizing plate to an outer side and a thickness of the pad is smaller than that of the second polarizing plate in a boundary surface between the second polarizing plate and the pad.

2. The display device of claim 1, wherein the functional panel includes a touch panel, a film patterned retarder (FPR), a parallax barrier panel, and a tempered glass.

3. The display device of claim 1, wherein an upper surface of the pad is a curved surface.

4. The display device of claim 1, wherein the pad is formed of polyethyleneterephthalate or silicon.

5. The display device of claim 1, further comprising:
    a conductive tape disposed below the pad.

6. The display device of claim 1, wherein the display panel is a liquid crystal display panel (LCD) or an organic electroluminescence display (OLED).

7. The display device of claim 1, further comprising an optical film between the display panel and the adhesive.

8. The display device of claim 1, wherein the adhesive layer includes one or more of OCA (Optical Clear Adhesive) and OCR (Optical Clear Resin).

* * * * *